(12) United States Patent
Van De Sluis et al.

(10) Patent No.: US 11,309,962 B2
(45) Date of Patent: Apr. 19, 2022

(54) DEVICE FOR IMAGE BASED SERVICES

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Mustafa Tolga Eren, Eindhoven (NL); Stephanus Joseph Johannes Nijssen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/965,322

(22) PCT Filed: Jan. 22, 2019

(86) PCT No.: PCT/EP2019/051479
§ 371 (c)(1),
(2) Date: Jul. 28, 2020

(87) PCT Pub. No.: WO2019/145286
PCT Pub. Date: Aug. 1, 2019

(65) Prior Publication Data
US 2021/0119700 A1    Apr. 22, 2021

(30) Foreign Application Priority Data
Jan. 29, 2018  (EP) .................................... 18153838

(51) Int. Cl.
*G01C 21/20*    (2006.01)
*H04B 10/116*   (2013.01)
(Continued)

(52) U.S. Cl.
CPC .......... *H04B 10/116* (2013.01); *H04B 10/60* (2013.01); *H04N 5/2353* (2013.01); *H04N 5/23245* (2013.01)

(58) Field of Classification Search
None
See application file for complete search history.

(56) References Cited

U.S. PATENT DOCUMENTS

2004/0169734 A1   9/2004  Umeyama
2005/0265731 A1  12/2005  Keum et al.
(Continued)

FOREIGN PATENT DOCUMENTS

| EP | 3105868 B1 | 9/2017 |
|----|------------|--------|
| WO | 2013108166 A1 | 7/2013 |
| WO | 2015094986 A1 | 6/2015 |

*Primary Examiner* — Patricia I Young (57) ABSTRACT

A device is provided having: a camera for capturing an image by capturing a repetitive series of a set of frames; wherein the camera comprises a first group of camera settings associated with detecting Visible Light Communication and a second group of camera settings not associated with detecting Visible Light Communication; wherein said set of frames comprises a first subset of frames and a second subset of frames, wherein each subset comprises at least one frame; a processor configured to switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings.

13 Claims, 4 Drawing Sheets

(51) Int. Cl.
 *H04B 10/60* (2013.01)
 *H04N 5/232* (2006.01)
 *H04N 5/235* (2006.01)

(56) References Cited

U.S. PATENT DOCUMENTS

| | | |
|---|---|---|
| 2014/0186026 A1 | 7/2014 | Oshima et al. |
| 2015/0010308 A1 | 1/2015 | Uedaira et al. |
| 2016/0191158 A1* | 6/2016 | Aoyama .............. H04B 10/116 398/172 |

* cited by examiner

DEVICE FOR IMAGE BASED SERVICES

CROSS-REFERENCE TO PRIOR APPLICATIONS

This application is the U.S. National Phase application under 35 U.S.C. § 371 of International Application No. PCT/EP2019/051479, filed on Jan. 22, 2029, which claims the benefit of European Patent Application No. 18153838.0, filed on Jan. 29, 2018. These applications are hereby incorporated by reference herein.

FIELD OF THE INVENTION

The invention relates to a device for image based services, wherein the device comprises a processor and a camera for capturing an image. The invention further relates to a method for image based services, the method being performed by a device comprising a camera and a processor. The invention further relates to a computer program product performing said method.

BACKGROUND OF THE INVENTION

An image based service may be defined as a service and/or an application which is enabled by images recorded with an image sensor, such as e.g. a camera. Image based services become more widespread, because image processing techniques and computing intelligence allow image data to be analyzed more effectively, more accurately, more efficiently, and more elaborately. Known image based services may comprise Augmented Reality, object recognition, emotion detection, image analytics, and/or indoor positioning based on coded light, e.g. Visible Light Communication (VLC). Thus, devices become ever more equipped with image sensors, such as e.g. cameras.

Visible Light Communication (VLC) refers to techniques whereby information is communicated in the form of a signal embedded in the visible light emitted by a light source. The signal is embedded by modulating a property of the visible light, typically the intensity, according to any of a variety of suitable modulation techniques. Based on the modulations, the information embedded in the light can be detected using any suitable light sensor, such as e.g. a photodiode and a camera. Detecting and/or decoding of such information is for example described in EP3105868B1. Similarly, coded light may refer to the same principles, but may also include the non-visible spectrum of light as well, such as LiFi.

The present invention relates to a device for image based services. Such a device, and a corresponding system, may e.g. be known from US2005/0265731A1, in which a short range wireless communication system is provided using a camera sensor module. The camera sensor module senses and converts optical signals into electrical signals and transfers the sensed signals to an image signal processor during a camera mode, but additionally sends the sensed signals to a demodulator during a communication mode. As the camera sensor module performs communication functions, such a system may enable Visible Light Communication.

Although such a system may enable Visible Light Communication effectively, it is nevertheless limited in application for image based services, because it cannot simultaneously enable the camera sensor module for Visible Light Communication and other image based services, such as e.g. Augmented Reality.

SUMMARY OF THE INVENTION

It is an object of the invention to provide an improved device for image based services. Thereto, the invention provides a device for image based services comprising: a camera for capturing an image by capturing a repetitive series of a set of frames; wherein the camera comprises a first group of camera settings associated with detecting Visible Light Communication and a second group of camera settings not associated with detecting Visible Light Communication; wherein said set of frames comprises a first subset of frames and a second subset of frames, wherein each subset comprises at least one frame; a processor configured to (i) switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings; (ii) enable image based services based on at least one frame of the first subset of frames and/or at least one frame of second subset of frames; wherein said first subset of frames comprises a first number of frames and said second subset of frames comprises a second number of frames; wherein the processor is further configured to increase or decrease said first number of frames and/or said second number frames based on a characteristic detected in the image and/or based on a sensor input to the device.

Such a device is using a concept of switching the camera periodically between the first group of camera settings and the second group of camera settings for capturing the image. Each first subset of frames of the repetitive series of the set of frames is hereby captured with said first group of camera settings. The first group of camera settings is particularly suitable for detecting Visible Light Communication. However, when camera settings are particularly suitable for detecting Visible Light Communication, said camera settings may typically not be suitable for accurately performing other image based services, which may not be associated with detecting VLC; because the detection of VLC is e.g. typically done at specific camera settings such as at least one of the group of underexposure, high ISO and low resolution. Hence, the second group of camera settings may be associated with another image based service, which may be opposite to the camera settings associated for detecting VLC. Therefore, the camera of the device according to the invention comprises a second group of camera settings not associated with detecting VLC. Such camera settings may at least be overexposure, low ISO and high resolution, as—opposite to the requirement of detecting VLC—specific details of objects in an image need to be identifiable for other image based services such as Augmented Reality, Object Recognition, emotion detection, iris scanning, etc.

Thereto, the device according to the invention comprises a processor configured to switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings. This is advantageous.

The effect of said switching is that the camera may capture an image, wherein each first subset of frames of the repetitive series of the set of frames may particularly be suitable for detecting VLC, whereas each second subset of frames of the repetitive series of the set of frames may particularly be suitable for image based services other than VLC, e.g. phrased as another image based services. Hence, two different image based services—one being VLC—may be enabled by only using a single camera comprised within a device according to the invention, wherein each of said two different image based services may operate with a desired camera setting suitable for their purpose. This is a clear advantage, and fulfills a clear need in the developing technical fields of image based services, visible light communication and image analytics.

As a result, a characteristic detected in the image may provide a cue for the device to capture the image with the first and/or second group of settings with higher and/or lower number of frames. This ensures an adaptive system, that is a device which may advantageously adapt the framerate of detecting the image with the first and/or second group of settings accordingly.

In an embodiment, the first group of camera settings comprises an exposure time of at most $\frac{1}{1000}$ seconds, wherein the second group of camera settings comprises an exposure time of at least $\frac{1}{1000}$ seconds.

As partly mentioned before, such a device is using a concept of switching the camera periodically between the first group of camera settings and the second group of camera settings for capturing the image. Each first subset of frames of the repetitive series of the set of frames is hereby captured with said first group of camera settings. As the first group of camera settings comprises an exposure time of at most $\frac{1}{1000}$ seconds, the first group of camera settings is particularly suitable for detecting VLC. Namely, the image captured by the first subset of frames will be underexposed; wherein underexposing typically results in a darkened image in which only the bright areas are more distinct. Thus, an image of a light source emitting a modulated light signal—e.g. VLC or coded light—may be detected more accurately, and the modulated light signal may be received more effectively. Setting the camera to the first group of camera settings is therefore a clear advantage for detecting VLC and/or coded light.

However, said first group of camera settings is typically not suitable for accurately performing other image based services, which may not be associated with detecting VLC. Hence, the second group of camera settings may be associated with another image based service. For example, as the first group of camera settings comprise an exposure time of at most $\frac{1}{1000}$, the image captured by the first subset of frames will be underexposed and hence prevent capturing and/or analyzing a detail in the image required for e.g. Augmented Reality, object recognition, emotion detection, etc. Such a detail may for example be an anchoring point for Augmented Reality, which may not be captured well by the image due to the underexposing. Such a detail may for example be a facial feature required for emotion detection, such as imaging an iris of an eye, which may not be captured well by the image due to the underexposing. Therefore, the camera of the device according to the invention comprises a second group of camera settings not associated with detecting VLC, wherein said second group of camera settings comprises an exposure time of at least $\frac{1}{1000}$ seconds.

Thereto, the device according to the invention comprises a processor configured to switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings.

The effect of said switching is that the camera may capture an image, wherein each first subset of frames of the repetitive series of the set of frames may particularly be suitable for detecting VLC, whereas each second subset of frames of the repetitive series of the set of frames may particularly be suitable for image based services other than VLC, e.g. phrased as another image based services. Hence, two different image based services—one being VLC—may be enabled by only using a single camera comprised within a device according to the invention, wherein each of said two different image based services may operate with a desired camera setting suitable for their purpose. This is a clear advantage, and fulfills a clear need in the developing technical fields of image based services, visible light communication and image analytics.

For example, in a non-limiting example, the present invention may enable a camera device to provide Indoor Positioning based on VLC, while simultaneously providing face recognition and/or emotion detection—e.g. based on imaging of an iris of an eye. Enabling said two different image based services with a single camera is advantageous, e.g. because the current state of the art does not allow to perform said services simultaneously by a single camera capturing an image; and because it may allow many applications, amongst others simultaneously mapping emotions to locations in a retail environment.

Here, said camera for capturing an image may in examples be phrased as a camera for recording an image.

Here, in examples, said detecting VLC (coded light) may comprise: detecting the light source emitting the coded light signal, distinguishing the light source emitting the coded light signal from other light sources and/or other light sources emitting a different coded light signal, receiving a larger footprint of the light source emitting the coded light signal at the camera cell, distinguishing a light source emitting a coded light signal from its surroundings, ensuring a faster detection/reception of the emitted code, etc.

Here, Visible Light Communication may refer to modulated light visible to the camera, such as a spectrum covered by a camera, and not necessarily or solely the spectrum visible to the human eye.

Here, according to an alternative aspect of the invention, said detecting Visible Light Communication may be mutatis mutandis detecting Coded Light. Coded light may hereby be emitted by a light source, a lamp, or a luminaire. Thus, according to said alternative aspect of the invention, the camera may comprise a first group of camera settings associated with detecting Coded Light and a second group of camera settings not associated with detecting Coded Light. The effects and advantages of the present invention including the feature of detecting VLC may mutatis apply to detecting CL.

Said device for image based processing may be part of a smartphone, a tablet, a smartwatch, a wearable device, a smart glass, an augmented reality goggle, virtual reality device, heads-up display, or a navigation device. Said device may comprise a transceiver to communicate with other devices or a back-end computing device, wherein part of the processing, e.g. the post-processing or image analytics employed to the image, may be performed at said other devices or the back-end computing device. Said communication may be by a wireless connection such as Wi-Fi, Bluetooth, VLC, LoRa, LiFi, ZigBee or RF.

Said image being captured by the camera may be a set of photographs or a video. The processor may comprise computational power to decode a code comprised within the image, such as a code related to coded light or VLC. The processor may comprise a local memory for storing information, such as the image. The processor may comprise computational power to perform image processing.

Said camera may be suitable for detecting coded light, and/or VLC. One way to detect VLC is e.g. using a rolling shutter type camera. Such cameras are often integrated into mobile devices such as smartphones or tablets. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Alternatively, in some examples, e.g. depending on the format for receiving VLC, the camera may be a global shutter camera.

In an embodiment, the device may comprise a display for displaying the image, wherein the display is arranged to display the image in a front-facing direction, wherein the camera is a front-facing camera directed towards the front-facing direction for capturing an image. Such an embodiment is advantageous, because the front-facing camera may capture an image of a user looking at the display of the device, which may enable image based applications such as e.g.: emotion detection of said user, while simultaneously being able to detect light sources emitting coded light or VLC behind the user, e.g. on a ceiling; gesture detection, face recognition, iris scanning, etc.

As mentioned, the first group of camera settings comprises an exposure time of at most $1/1000$ seconds. In embodiments, the first group of camera settings may comprise an exposure time of at most $1/1500$ seconds, at most $1/2000$ seconds, at most $1/3000$ seconds, at most $1/4000$ seconds, or between at least $1/2000$ seconds and at most $1/1000$ seconds. Since a shorter exposure time renders more contrast between bright areas and dark areas within a captured image, a bright feature such as a light source may become more distinct in the image in comparison to the light source surroundings by decreasing the exposure time. Such a distinction is therefore advantageous in detecting VLC or coded light signals emitted by a light source, such as a light source comprised within a luminaire. Said exposure time ranging between at least $1/2000$ seconds and at most $1/1000$ seconds may be particularly advantageous for use in Visible Light Communication based on e.g. current Philips practice. Namely, said exposure time is related to the symbol clock of the device for detecting a Visible Light Communication signal. See also below. The notion of symbol clock of the device is known to a person skilled in the art, because e.g. a VLC signal may be encoded with a symbol rate of 1 kHz, 2 kHz, or e.g. 4 kHz. Here, for example, the exposure time of at most $1/1000$ seconds therefore corresponds with halve of a 2 kHz rate of the symbol clock, which 2 kHz rate is in agreement with current Philips practice. Moreover, said exposure time of at most $1/2000$ seconds similarly agrees with said symbol clock of devices used in the current Philips practice; e.g. indoor positioning based on VLC.

Furthermore, as mentioned, the second group of camera settings comprises an exposure time of at least $1/1000$ seconds. In embodiments, the second group of camera settings may comprise an exposure time of at least $1/800$ seconds, at least $1/500$ seconds, at least $1/250$ seconds, at least $1/100$ seconds, or between at least $1/1000$ seconds and at most $1/500$ seconds. Due to a higher exposure time, details in an image captured with said higher exposure time may be visible. Such details may be relevant for image based processing such as Augmented Reality, object recognition, emotion detection, etc.

In alternative embodiments, said exposure time may depend on the rate of exposure of a mechanical filter positioned in the view of the camera.

Yet alternatively, in examples, the first group of camera settings comprises a first exposure time, and the second group of camera settings comprises a second exposure time, wherein the first exposure time is shorter than the second exposure time. Moreover, in a further embodiment, the first exposure time is at least $1/500$ seconds shorter than the second exposure time. This will ensure a clear difference between the first group of camera settings and the second group of camera settings, such that the first group of camera settings are more suitable for detecting VLC, whereas the second group of camera settings is oppositely more suitable for other image based services.

As known to a person skilled in the art: Data may be modulated into light by means of a technique such as amplitude keying or frequency shift keying, whereby the modulated property (e.g. amplitude of frequency) is used to represent channel symbols. The modulation typically involves a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example is the Ternary Manchester code. Moreover, for example a coded light signal may be encoded with a symbol rate of said symbols being 1 kHz, 2 kHz or 4 kHz.

Here, said exposure time may also be correlated to a property of the camera or the device. It may for example be advantageous to correlate the exposure time to the decoding scheme of the Visible Light Communication and/or coded light messages. See for example EP3105868B1 for decoding VLC and/or coded light messages. Hence, in an embodiment, the first group of camera settings may comprise an exposure time proportional to a symbol clock of the device, the symbol clock being related to detecting the Visible Light Communication.

In further embodiments, the first group of camera settings may comprise an exposure time equal to at least a quarter or at least halve of a symbol clock of the device, the symbol clock being related to detecting the Visible Light Communication. Hence, relating the properties of detecting VLC, which is the rate of the symbol clock of the device, to the exposure time of the camera of the device, this will enable to select an advantageous exposure time for detecting VLC in particular.

An ISO value (of a camera device) may also influence the effectiveness of detecting VLC, while adversely influencing the effectiveness of other image based services applications, such that said switching according to the invention is advantageous. Hence, in an embodiment, the first group of camera settings may comprise an ISO value of at least 400. As the first group of camera settings comprises an ISO value of at least 400, the first group of camera settings is particularly suitable for detecting VLC. Namely, the camera capturing the image in the first subset of frames comprising an ISO value of at least 400 may be more sensitive to light. Thus, an image of a light source emitting a modulated light signal—e.g. VLC or coded light—may be detected more effectively due to the increased footprint of the light source (e.g. comprising a 'halo' in the captured image). Thus, the modulated light signal may be received more effectively.

Setting the camera to the first group of camera settings is therefore a clear advantage for detecting VLC and/or coded light. However, said first group of camera settings comprising an ISO value of at least 400 is typically not suitable for accurately performing other image based services, which may not be associated with detecting VLC. For example, as the first group of camera settings comprise an ISO value of at least 400, the image captured by the first subset of frames will comprise more granularity and noise, hence limiting image quality and preventing to capture and/or analyze details in the image. Such details may e.g. be required for Augmented Reality, object recognition, emotion detection, etc. Hence, in an embodiment, the second group of camera settings may comprise an ISO value of at most 400. Thus, considering the above, said switching according to the invention is advantageous to improve image based services associated with detecting VLC and simultaneously improve other image based services not associated with detecting VLC, both with a single camera.

Alternatively, the first group of camera settings may comprise an ISO value of at least 800, at least 1600, or at least 3200. Alternatively, the second group of camera settings may comprise an ISO value of at most 400, at most 200, at most 100, at most 50, or equal to 50, or an auto ISO not extending beyond a value of 400.

Resolution of capturing the image with the camera may also influence the effectiveness of detecting VLC, while adversely influencing the effectiveness of other image based services applications, such that said switching according to the invention is advantageous. Hence, in an embodiment, the first group of camera settings may comprise a resolution of at most 1 megapixel, wherein the second group of camera settings may comprise a resolution of at least 1 megapixel. As the first group of camera settings comprises a resolution of at most 1 megapixel, the first group of camera settings is particularly suitable for detecting VLC. Namely, an image of a light source emitting a modulated light signal—e.g. VLC or coded light—may be detected more effectively, because a higher resolution slows down VLC detection due to the increase processing time (and increased depletion of battery power). A resolution of at most 1 megapixel is particularly suitable for detecting VLC. Setting the camera to the first group of camera settings is therefore a clear advantage for detecting VLC and/or coded light. However, said first group of camera settings comprising a resolution of at most 1 megapixel is typically not suitable for accurately performing other image based services, which may not be associated with detecting VLC; because such image based services may require more and more resolution to improve the detection of detail. Such a detail may e.g. be required for Augmented Reality, object recognition, emotion detection; for example, detecting an iris of an eye or a change in facial features. Thus, considering the above, said switching according to the invention is advantageous to improve image based services associated with detecting VLC and simultaneously improve other image based services not associated with detecting VLC, both with a single camera.

Alternatively, the first group of camera settings may comprise a resolution of at most 0.8 megapixel, or at most 0.5 megapixel. Alternatively, the second group of camera settings may comprise resolution of at least 2 megapixel, at least 4 megapixel, at least 8 megapixel, at least 10 megapixel, or at least 12 megapixel, or between at least 4 megapixel and at most 12 megapixel.

A focus of a camera in capturing the image may influence the effectiveness image based services not associated with detecting VLC. An image may comprise a feature representing a physical feature. In a real environment said physical feature may be in view of the camera. Such a physical feature may be a luminaire comprising edges defining a shape. An image of said physical feature, here the luminaire, may comprise a feature representing said physical feature, i.e. e.g. the edges in the image defining the shape of the luminaire. The camera may further comprise a lens arrangement, which is configured to set a point of focus of the camera, hence the focus of the image. When an object is at the point of focus of the lens arrangement, an image of said object will be at its sharpest according to Optics. Any deviation from that point of focus will render a blurrier image. For detecting VLC, a blurrier image may be more suitable. Namely, an image of a light source emitting a modulated light signal—e.g. VLC or coded light—may be detected more effectively due to the increased footprint of the light source in the captured image. However, such 'out of focus' may not be suitable for accurately performing other image based services, which may not be associated with detecting VLC; because such image based services may require focus to improve the detection of detail. For example, in image analytics or object recognition applications said edges of said luminaire may need to be accurately in focus to determine the shape of the luminaire, such that for example the luminaire may be recognized.

Hence, in an embodiment, the image may comprise a feature representing a physical feature, and wherein the second group of camera settings may comprise a point of focus set to a distance defined between 90% and 110% of a shortest distance between the camera and the physical feature. Thus, considering the above, said switching according to the invention is advantageous to improve image based services associated with detecting VLC and simultaneously improve other image based services not associated with detecting VLC, both with a single camera. Alternative, said distance may be defined between 95% and 105% of a shortest distance between the camera and the physical feature.

In a related embodiment, the image may comprise a feature representing a physical feature, and wherein the first group of camera settings may comprise a point of focus set to a distance defined other than between 90% and 110% of a shortest distance between the camera and the physical feature.

As mentioned, the camera is arranged for capturing an image by capturing a repetitive series of a set of frames, wherein said set of frames may comprise a first subset of frames and a second subset of frames, wherein each subset may comprise at least one frame; and wherein the processor is configured to switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings.

The camera may comprise a framerate for recoding the image. Said framerate is the number of frames per second to capture the image with the camera. Said framerate may for example be 30 fps or 60 fps, or alternatively be 120 fps in case of e.g. slow-motion capturing, 25 fps or 50 fps.

The set of frames is repetitive. Thus, the camera is arranged for recoding an image by capturing a repetitive series of a set of frames. Said set of frames may comprise a first subset of frames and a second subset of frames. The processor may set the number of frames in each subset.

In an embodiment, said first subset of frames and said second subset of frames may comprise an equal number of frames. Such an equal number of frames may for example be one frame, two frames, three frames or four frames. Hence, in an embodiment, said first subset of frames may comprise two frames and the second subset of frames may comprise two frames. The effect of said equal number of frames is that the set of frames is divided in an equal number of frames for the first subset and the second subset. Said switching may thus occur per every frame captured by the camera; or per every two frames, three frames, etc. As the set of frames is repetitive, this may render a series wherein the camera effectively captures the image with the two different groups of settings. Consequently, switching per e.g. very frame renders that the camera effectively captures the image with the first group of settings in halve the framerate of the framerate of the camera, and the same applies to the second group of settings. Switching per e.g. every two frames renders that the camera effectively captures the image with the first group of settings in a quarter of the framerate of the camera, and the same applies to the second group of settings.

In each set of frames, the first subset of frames and the second subset of frames may be in arbitrary order within each set of frames of the repetitive series. However, the order may also be set. Hence, in an embodiment, the first subset of frames precedes the second subset of frames. Thus, the first subset of frames precedes the second subset of frames in the set of frames. This facilitates further processing of the captured image, as the first subset of frames captured with the group of camera settings associated with VLC will structurally precede the second subset of frames captured with the group of camera settings not associated with VLC.

The number of frames in each subset of frames may also be different, i.e. not equal. This may be advantageous as detecting VLC may require more frames than an application not associated with detecting VLC, or vice versa. The device may provide such flexibility. Hence, as mentioned, said first subset of frames may comprise a first number of frames and said second subset of frames may comprise a second number of frames; wherein the processor may further be configured to increase or decrease said first number of frames and/or said second number frames based on a characteristic detected in the image. As a result, a characteristic detected in the image may provide a cue for the device to capture the image with the first and/or second group of settings with higher and/or lower number of frames. This ensures an adaptive system, that is a device which may advantageously adapt the framerate of detecting the image with the first and/or second group of settings accordingly.

In an embodiment, the characteristic may be one of: a facial feature, a luminaire, a light source, a movement of an object, a gesture, a person, an emotion, a contour, an edge, a shape, a code, or a location indicator. For example, based on detecting a face, the second subset may be set to comprise more frames, i.e. e.g. from one frame initially to three frames after detecting the face in the image (by image processing means).

As mentioned, said first subset of frames may comprise a first number of frames and said second subset of frames may comprise a second number of frames; wherein the processor may further be configured to increase or decrease said first number of frames and/or said second number frames based on a sensor input to the device. As a result, a sensor input may provide a cue for the device to capture the image with the first and/or second group of settings with higher and/or lower number of frames. This ensures an adaptive system, that is a device which may advantageously adapt the framerate of detecting the image with the first and/or second group of settings accordingly. For example, detecting an orientation of the device with an orientation sensor, and corresponding sensor input, may cause the device to configure the first subset with a higher number of frames, as the detected orientation of the device may indicate a priority in using an image based service comprising VLC (e.g. horizontal orientation such that luminaires in a ceiling are detected is an indication of initializing an image based service comprising VLC).

In an embodiment, the sensor input may be one of: a velocity of the device, an acceleration of the device, a rotation of the device, an intensity of light detected by the device, a color of light detected by the device, an audio signal, or a detected position. For example, the sensor input may comprise a detected intensity of light, wherein the light may be modulated and comprising a code. Thus, the code may be an incentive to increase the number of frames corresponding to the first subset of frames. This enables more functionality to the device in image based services and an adaptive control thereof.

Hence, in an embodiment, the processor may be configured to increase said first number of frames based on detecting a light source. In another embodiment, the processor may be configured to increase said second number of frames based on detecting a facial feature.

It is a further object of the invention to provide an improved method for image based services. Thereto, the invention further provides a method for image based services, the method being performed by a device comprising a camera and a processor; wherein the camera comprises a first group of camera settings associated with detecting Visible Light Communication and a second group of camera settings not associated with detecting Visible Light Communication; wherein the method comprises the steps of: capturing an image with the camera by capturing a repetitive series of a set of frames, wherein said set of frames comprises a first subset of frames and a second subset of frames, wherein each subset comprises at least one frame; switching the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings; enabling image based services based on at least one frame of the first subset of frames and/or at least one frame of the second subset of frames; wherein said first subset of frames comprises a first number of frames and said second subset of frames comprises a second number of frames; wherein the method further comprises the step of: increasing or decreasing said first number of frames and/or said second number frames based on a characteristic detected in the image and/or based on a sensor input to the device.

The method may be performed by the device for image based services according to the invention. Moreover, the embodiments of the device according to the invention may mutatis mutandis apply to the method according to the invention.

In an embodiment, said method is provided, wherein the first group of camera settings comprises an exposure time of at most $1/1000$ seconds, wherein the second group of camera settings comprises an exposure time of at least $1/1000$ seconds.

Thus, as mentioned, said first subset of frames may comprise a first number of frames and said second subset of frames comprises a second number of frames; wherein the method further comprising: increasing or decreasing said first number of frames and/or said second number frames based on a characteristic detected in the image.

Thus, as mentioned, said first subset of frames may comprise a first number of frames and said second subset of frames comprises a second number of frames; wherein the method further comprising: increasing or decreasing said first number of frames and/or said second number frames based on a sensor input to the device.

Moreover, the embodiments of the device according to the invention may mutatis mutandis apply to the embodiments of the method according to the invention.

The invention further relates to a computer program product. Hence, the invention provides a computer program product for a computing device, the computer program product comprising computer program code to perform the method according to the invention when the computer program product is run on a processing unit of the computing device. For example, said computing device may also be the device according to the invention or the processor provided in the device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION OF THE EMBODIMENTS

Figure 1:
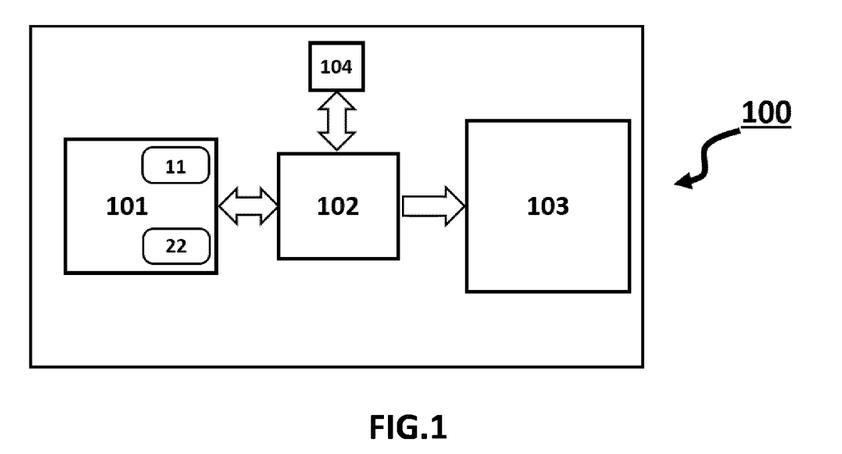
FIG. 1 depicts schematically a device for image based services comprising a camera and a processor.
Figure 2:
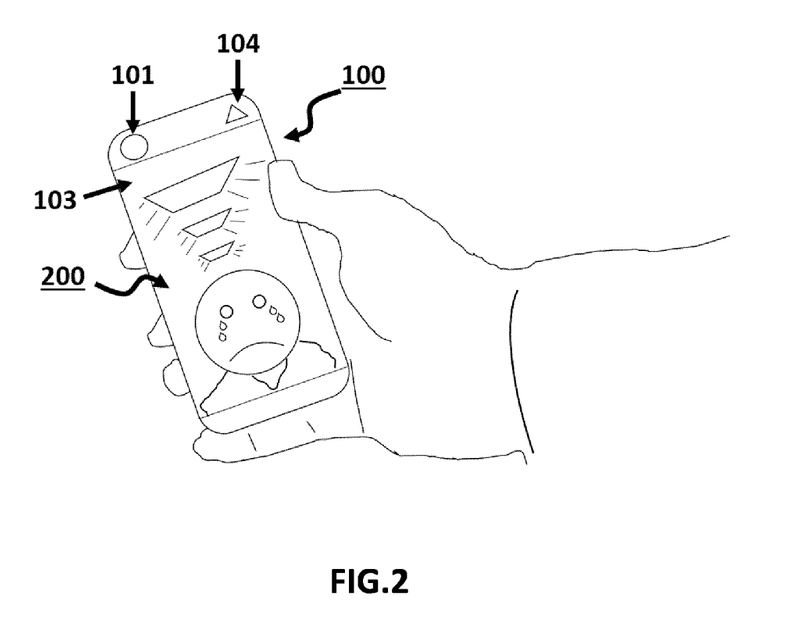
FIG. 2 depicts schematically a perspective view thereof.

FIG. 1 and FIG. 2 depict schematically, by non-limiting example, an embodiment of a device 100 for image based services. Said device 100 comprises a camera 101 for capturing an image 200 and a processor 102. The image 200 is being displayed on the display 103 of the device 100. Alternatively, the image 200 does not required to be displayed but may be processed internally. The camera 101 is a front-facing rolling-shutter camera directed in the same direction the display 103 is displaying. The device 100 further comprises a detector 104 being an orientation sensor.

The image 200 is being used for image based services. Here, the image 200 comprises a typical view from a front-facing camera being used for Indoor Positioning based on Visible Light Communication, which is a face 202 of a user holding the device 100 with VLC enabled luminaires 201 in the background; and at the same time the image 200 is being used for emotion detection. Alternatively, the image may be used for Augmented Reality, object recognition, image analytics, as well or instead of the emotion detection.

Alternatively, the camera may be a global-shutter camera. Alternatively, the camera may be direction in any other direction, e.g. opposite to the front-facing direction of the device, such as a back-facing camera. The camera may even be a 360-degree camera. Here, the device is embodied as part of a smartphone device, but may alternatively be part of another hand-held device, a tablet, a smartwatch, a wearable device, a smart glass, an augmented reality goggle, virtual reality device, heads-up display, or a navigation device. The camera 101 comprises a first group of camera settings 11 associated with detecting Visible Light Communication, and a second group of camera settings 22 not associated with detecting Visible Light Communication. To be more specific, the second group of camera settings 22 is being associated with emotion detection.

Figure 3:
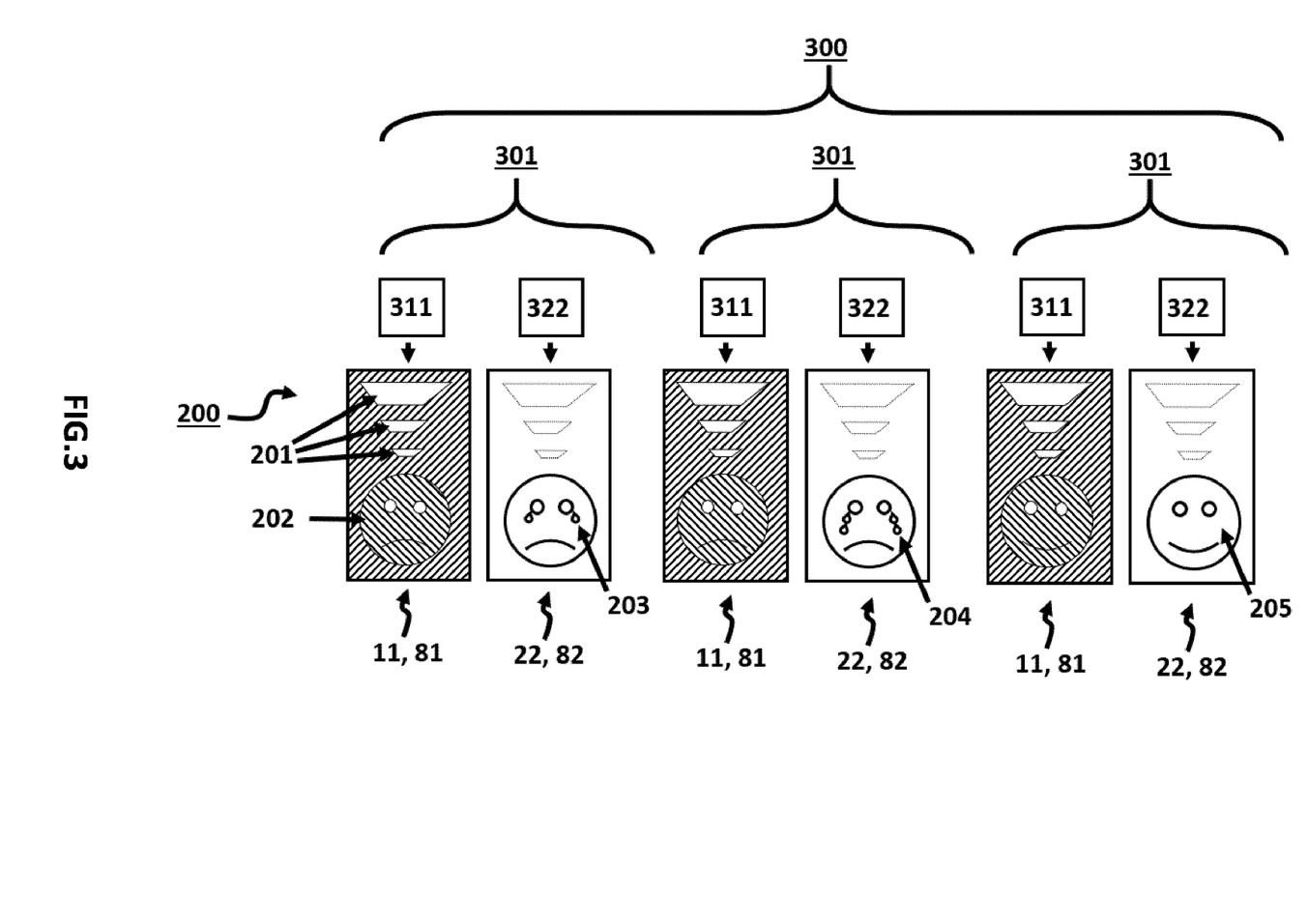
FIG. 3 depicts schematically a repetitive series of a set of frames of a captured image, wherein said set of frames comprises a first subset of frames and a second subset of frames.

Now referring to FIG. 3, the camera 101 captures the image 200 by capturing a repetitive series 300 of a set of frames 301. Said set of frames 301 comprises a first subset of frames 311 and a second subset of frames 322. Each subset 311, 322 comprises one frame. Hence, both subset of frames 311, 312 comprise an equal number of frames. Moreover, the first subset of frames 311 precedes the second subset of frames 312. Alternatively, each subset comprises at least one frame. The number of frames in both subset of frames 311, 312 may for example be another value, such as 1, 3, 4, 5, or 6, or even 50 or 60.

In alternative embodiments (not depicted), the first subset of frames and the second subset of frames may comprise a different number of frames. For example, the first subset of frames may comprise 2 frames, while the second subset of frames may comprise 1 frame. Other combinations such as the first subset of frames versus the second subset of frames being in the number of frames may be equal to 1:2, 1:3, 1:4, 1:5, 2:3, 2:4, 2:5, 3:4, 3:5, 4:5, or vice versa.

Still referring to FIG. 1, FIG. 2 and FIG. 3, the device 100 further comprises a processor 102. The processor 102 is configured to switch the camera 101 periodically between the first group of camera settings 11 and the second group of camera settings 22 for capturing the image 200. The processor 102 of the device 100 enables this by instructing the camera 101 to capture each first subset of frames 311 of the repetitive series 300 of the set of frames 301 with the first group 11 of camera settings; and to capture each second subset of frames 322 of the repetitive series 300 of the set of frames 301 with the second group of camera settings 22.

Here, the first group of camera settings 11 comprises an exposure time 81 of at most $1/1000$ seconds. Moreover, the second group of camera settings 22 comprises an exposure time 82 of at least $1/1000$ seconds. Alternatively, said first group of camera settings may comprise an exposure time of at most $1/1500$ seconds, at most $1/2000$ seconds, at most $1/3000$ seconds, at most $1/4000$ seconds, or between at least $1/2000$ seconds and at most $1/1000$ seconds. Yet Alternatively, said second group of camera settings may comprise an exposure time of at least $1/800$ seconds, at least $1/500$ seconds, at least $1/250$ seconds, at least $1/100$ seconds, or between at least $1/1000$ seconds and at most $1/500$ seconds.

Yet alternatively, the first group of camera settings may comprise an exposure time proportional to a symbol clock of the device, the symbol clock being related to detecting the Visible Light Communication during e.g. the indoor positioning.

In photography, a shorter exposure time renders relatively more contrast between bright areas and dark areas within a captured image; a bright feature such as a light source may therefore become more distinct in the image in comparison to its surroundings by a decrease in the exposure time. Such a distinction is advantageous in detecting VLC or coded light signals emitted by e.g. a light source.

Referring to FIG. 3, as the first group of camera settings 11 comprises an exposure time 81 of at most 1/1000 seconds, the first group of camera settings 11 is particularly suited for detecting VLC. Namely, the image 200 captured by the first subset of frames 311 will be underexposed; wherein underexposing typically results in a darkened image in which only the bright areas, such as luminaires 201 in the image 200, are more distinct. Setting the camera 101 to the first group of camera settings 11 is therefore a clear advantage for detecting VLC and/or coded light.

However, said first group of camera settings 11 is typically not suitable for accurately performing other image based services, which may not be associated with detecting VLC, such as the emotion detection in the present embodiment; because said underexposure may prevent capturing and/or analyzing details in the image 200 required for emotion detection, such as the tears 203, 204 of the face 202 of the user in the image 200. In time, the initial tears 203 intensify in more tears 204 and eventually dry up to a happy face 205. Such an emotion change is difficult to capture with the first group of camera settings 11 due to said underexposure and lack of capturing details. Therefore, the camera of the device according to the invention comprises a second group of camera settings 22 not associated with detecting VLC, wherein said second group of camera settings 22 comprises an exposure time 82 of at least 1/1000 seconds.

As mentioned, the processor 102 is configured to switch the camera 101 periodically between the first group of camera settings 11, 81 and the second group of camera settings 22, 82 for capturing the image 200. Consequently, the captured image 200 is captured by each first subset of frames 311 of the repetitive series 300 of the set of frames 301 with the first group of camera settings 11, 81; and by each second subset of frames 322 of the repetitive series 300 of the set of frames 301 with the second group of camera settings 22, 82. As a result, two different image based services, i.e. the one being Indoor Positioning based on VLC and the other being emotion detection, are enabled using a single camera 101 comprised within the device 100.

Thus, the processor 102 is enabling improved image based services related to indoor positioning based on VLC based on the frames captured with the first subset of frames 311, as said first subset of frames 311 is captured with the first camera settings 11; while enabling image based services related to emotion detection based on the frames captured with the second subset of frames 322, as said second subset of frames 322 is captured with the second camera settings 22.

One application of the device 100 enabling indoor positioning based on VLC and emotion detection simultaneously with a single camera is that an emotion map may be established in a retail environment, wherein indoor navigation is accurately performed due to the first group of camera settings 11 being particularly suited for detecting VLC (e.g. the VLC emitting luminaires 201), while still be able to detect emotions 203, 204, 205 of a user 202 due to the second group of camera settings 22 being particularly suited for detecting emotions 203, 204, 205. With the use of such an emotion map, retailers may be provided with an insight in consumer interests at various locations and e.g. provide advertisements accordingly.

Alternatively, in addition to said exposure time or instead of said exposure time, the first group of camera settings may comprise an ISO value of at least 400, whereas the second group of camera settings may comprise an ISO value of at most 400. Namely: An ISO value (of a camera device) may also influence the effectiveness of detecting VLC, while adversely influencing the effectiveness of other image based services applications such as emotion detection. Thus, as mentioned, said switching according to the invention is advantageous. Yet alternatively, the first group of camera settings comprises an ISO value of at least 800, at least 1600, or at least 3200. Yet alternatively, the second group of camera settings comprises an ISO value of at most 400, at most 200, at most 100, at most 50, or equal to 50, or an auto ISO not extending beyond a value of 400.

Alternatively, in addition to said exposure time or instead of said exposure time, the second group of camera settings may comprise a point of focus, the point of focus being set to the face of the user and not the luminaires in the ceiling. As a result, the tears of the user may be captured accordingly, such that emotion detection may be facilitated. Thus, considering the above, said switching according to the invention is advantageous to improve image based services associated with detecting VLC and simultaneously improve emotion detection, which is another image based service not associated with detecting VLC, both with a single camera.

In an alternative embodiment (not depicted), partly similar to the embodiment depicted in FIGS. 1 to 3, but now the detector is configured to sense an orientation of the device, which is a horizontal orientation with respect to gravity; hence the horizontal orientation indicating the use of the device for indoor positioning by means of VLC as the coded light emitting luminaires are mainly on the ceiling. Upon detecting said horizontal orientation, based thereon, the processor increases the number of frames in the first subset of frames to three frames, while keeping the number of frames in the second subset of frames to a single frame. Consequently, the relationship between the number of frames in the first subset compared to the second subset becomes 3:1. Hence, more frames are available now to capture the image with the first group of camera settings, which are associated with detecting VLC and are more suited for detecting VLC. This is advantageous, because the horizontal orientation of the device already indicates that the relevance of the device for use in indoor positioning has become larger compared to e.g. other image based services. Increasing the number of frames in the first subset of frames will therefore improve and speed up VLC detection.

Figure 4:
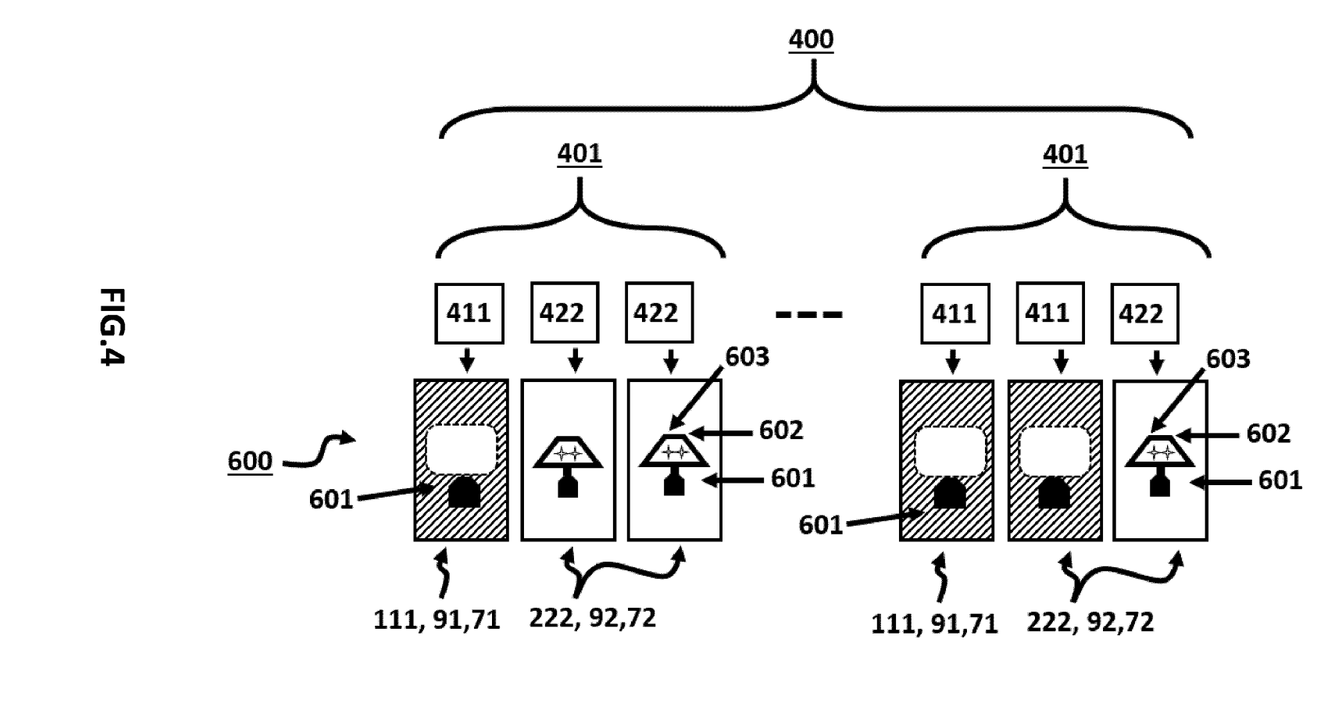
FIG. 4 depicts schematically another repetitive series of a set of frames of a captured image, wherein said set of frames comprises a first subset of frames and a second subset of frames.

FIG. 4 depicts schematically, by non-limiting example, an embodiment of a device for image based services, which is partly similar to the embodiments depicted in FIG. 1 and FIG. 2, but now the camera captures the image 600 by capturing a (different) repetitive series 400 of a set of frames 401. Said set of frames 401 comprises a first subset of frames 411 and a second subset of frames 422. The first subset of frames 411 comprises one frame. The second subset of frames 422 comprises two frames. Moreover, the first subset of frames 411 precedes the second subset of frames 422.

The image 600 is being used for image based services. Here, the image 600 comprises a view of a camera looking at lighting device. The image 600 is being used by the device internally for both VLC communication and Augmented Reality. For the use of Augmented Reality, the position of the lighting device edges is required to be identified with image analysis, e.g. for establishing anchoring points for Augmented Reality information. For the VLC communication, on the contrary, a large footprint of the light emitted by the lighting device is required.

Similarly mentioned before, the camera comprises a first group of camera settings 111 associated with detecting Visible Light Communication, and a second group of camera settings 222 not associated with detecting Visible Light Communication. To be more specific, the second group of camera settings 222 is being associated with Augmented Reality and image analysis.

Still referring to FIG. 4, the device further comprises a processor. The processor is configured to switch the camera periodically between the first group of camera settings 111 and the second group of camera settings 222 for capturing the image 600. The processor of the device enables this by instructing the camera to capture each first subset of frames 411 of the repetitive series 400 of the set of frames 401 with the first group 111 of camera settings; and to capture each second subset of frames 422 of the repetitive series 400 of the set of frames 401 with the second group of camera settings 222.

Here, the first group of camera settings 111 comprises an exposure time 91 of $1/1800$ seconds. Moreover, the second group of camera settings 222 comprises an exposure time 92 of $1/500$ seconds. Furthermore, the first group of camera settings 111 comprises a resolution 71 of 0.5 megapixels, whereas the second group of camera settings 222 comprises a resolution 72 of 8 megapixels.

As mentioned, a shorter exposure time renders relatively more contrast between bright areas and dark areas within a captured image; a bright feature such as a light source may therefore become more distinct in the image in comparison to its surroundings by a decrease in the exposure time. Such a distinction is advantageous in detecting VLC or coded light signals emitted by e.g. a light source.

Referring to FIG. 4, as the first group of camera settings 111 comprises an exposure time 91 of $1/1800$ seconds and a resolution 71 of 0.5 megapixels, the first group of camera settings 111 is particularly suited for detecting VLC. Namely, the image 600 captured by the first subset of frames 411 will be underexposed and less resolute. The underexposing typically results in a darkened image in which only the bright areas, such as the light emitted by the lighting device 601 in the image 600, are more distinctly seen. Moreover, the lesser resolution additionally causes the footprint ('blob') of the light emitted by the lighting device 601 to be seen with an increased size, which larger sized footprint may be decoded more effectively and faster (as less pixels are required to be analyzed with a lower resolution, less processing power is required and less battery power). Setting the camera to the first group of camera settings 111 is therefore a clear advantage for detecting VLC and/or coded light.

Referring to FIG. 4, as the second group of camera settings 222 comprises an exposure time 92 of $1/500$ seconds and a resolution 72 of 8 megapixels, the second group of camera settings 222 is particularly suited for detecting details in the image for facilitating Augmented Reality and image analysis. Namely, the image 600 captured by the second subset of frames 422 will be overexposed and comprises a high resolution. The overexposure typically results in a bright image wherein details are clearly visible, such as the edges 602 of the lighting device 601 in the image 600. Thus, the lighting device 601 may be identified and anchoring locations on the lighting device 601 may be found for positioning augmented reality information. This is also an advantageous effect of the higher resolution. Setting the camera to the second group of camera settings 222 is therefore a clear advantage for Augmented Reality applications and image analysis.

As mentioned, the processor is configured to switch the camera periodically between the first group of camera settings 111, 91, 71 and the second group of camera settings 222, 92, 72 for capturing the image 600. Consequently, the captured image 600 is captured by each first subset of frames 411 of the repetitive series 400 of the set of frames 401 with the first group of camera settings 111, 91, 71; and by each second subset of frames 422 of the repetitive series 400 of the set of frames 401 with the second group of camera settings 222, 92, 72. As a result, two different image based services, i.e. the one being VLC communication and the other being Augmented Reality, are enabled and improved using a single camera comprised within the device according to the invention.

Furthermore, still referring to the embodiment depicted in FIG. 4, the number of frames in each subset of frames 401 may change upon detection of a characteristic 603 in the image 600. Here, as depicted, the processor may process the image 600 and detect/identify/infer that the lighting device comprises a filament type of light bulb, e.g. based on the shape of said lighting device or visually seeing the filaments. Subsequently, the processor is configured to increase the number of frames of the first subset of frames 411 from one frame to two frames, and to decrease the number of frames of the second subset of frames 422 from two frames to one frame. This ensures an adaptive system.

Alternatively, said characteristic may be one of: a facial feature, a luminaire, a light source, a movement of an object, a gesture, a person, an emotion, a contour, an edge, a shape, a code, or a location indicator. For example, based on detecting a face, the second subset may be set to comprise more frames, i.e. e.g. from two frames initially to three frames after detecting the face in the image (by image processing means).

Figure 5:
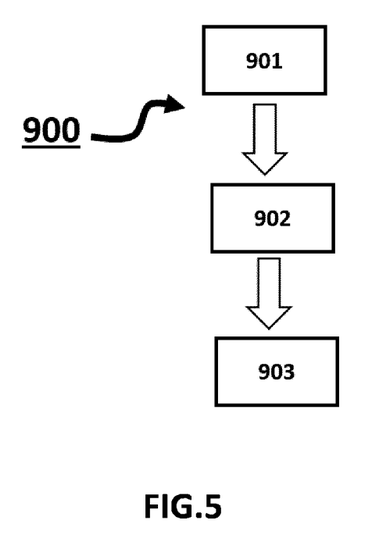
FIG. 5 depicts schematically a method for image based services according to the invention.

FIG. 5 depicts schematically a method 900 for image based services according to the invention. The method 900 is being performed by a device comprising a camera and a processor; wherein the camera comprises a first group of camera settings associated with detecting Visible Light Communication and a second group of camera settings not associated with detecting Visible Light Communication, but with object recognition. The first group of camera settings comprises an exposure time of $1/1500$ seconds, and the second group of camera settings comprises an exposure time of $1/800$ seconds. The method comprises the step 901 of capturing an image with the camera by capturing a repetitive series of a set of frames, wherein said set of frames comprises a first subset of frames and a second subset of frames, wherein each subset comprises at least one frame. Here, the first subset comprises two frames and the second subset comprises two frames. Alternatively, other number of frames may be comprised by each subset. Subsequently, the method comprises the step 902 of switching the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings. This enables that with a single camera both VLC may be detected accordingly, as well as the object recognition may be performed effectively, as the exposure time for both image based services is tuned accordingly for the respective purpose. Subsequently, the method comprises the step 903 of enabling image based services based on at least one frame of the first subset of frames and/or at least one frame of second subset of frames. The image comprises a person's face. Thus, the method further comprises the step of 904 increasing said number frames of the second subset of frames based on a characteristic detected in the image; said characteristic being the person's face. Hence, as the device detects in the image that a face is being analyzed, more frames are being used for object recognition so as to improve said detection, while keeping the image suitable for VLC with the first subset of frames.

Alternatively, the method may comprise increasing or decreasing said number of frames of the first subset of frames and/or said number frames of the second subset of frames based on a sensor input to the device.

The invention claimed is:

1. A device for image based services comprising:
   a camera for capturing an image by capturing a repetitive series of a set of frames;
   wherein the camera comprises a first group of camera settings associated with detecting Visible Light Communication and a second group of camera settings not associated with detecting Visible Light Communication;
   wherein said set of frames comprises a first subset of frames and a second subset of frames, wherein each subset comprises at least one frame;
   a processor configured to:
   (i) switch the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings;
   (ii) enable image based services based on at least one frame of the first subset of frames and/or at least one frame of the second subset of frames;
   wherein said first subset of frames comprises a first number of frames and said second subset of frames comprises a second number of frames;
   wherein the processor is further configured to increase or decrease said first number of frames and/or said second number frames responsive to a characteristic detected in the image, wherein the characteristic in the image provides a cue for the device to increase or decrease said first number of frames and/or said second number frames.

2. The device according to claim 1, wherein the characteristic is one of: a facial feature, a luminaire, a light source, a movement of an object, a gesture, a person, an emotion, a contour, an edge, a shape, a code, or a location indicator.

3. The device according to claim 1, wherein the first group of camera settings comprises an exposure time of at most $1/1000$ seconds, wherein the second group of camera settings comprises an exposure time of at least $1/1000$ seconds.

4. The device according to claim 1, wherein the first group of camera settings comprises an exposure time proportional to a symbol clock of the device, the symbol clock being related to detecting the Visible Light Communication.

5. The device according to claim 1, wherein the first group of camera settings comprises an exposure time equal to at least a quarter of a symbol clock of the device, the symbol clock being related to detecting the Visible Light Communication.

6. The device according to claim 1, wherein the first group of camera settings comprises an ISO value of at least 400.

7. The device according to claim 1, wherein the first group of camera settings comprises a resolution of at most 1 megapixel, wherein the second group of camera settings comprises a resolution of at least 1 megapixel.

8. The device according to claim 1, wherein the image comprises a feature representing a physical feature, and wherein the second group of camera settings comprises a point of focus set to a distance defined between 90% and 110% of a shortest distance between the camera and the physical feature.

9. The device according to claim 1, wherein said first subset of frames and said second subset of frames comprise an equal number of frames.

10. A method for image based services, the method being performed by a device comprising a camera and a processor:
    wherein the camera comprises a first group of camera settings associated with detecting Visible Light Communication and a second group of camera settings not associated with detecting Visible Light Communication;
    wherein the method comprises the steps of:
    capturing an image with the camera by capturing a repetitive series of a set of frames, wherein said set of frames comprises a first subset of frames and a second subset of frames, wherein each subset comprises at least one frame;
    switching the camera periodically between the first group of camera settings and the second group of camera settings for capturing the image by capturing each first subset of frames of the repetitive series of the set of frames with the first group of camera settings and each second subset of frames of the repetitive series of the set of frames with the second group of camera settings;
    enabling image based services based on at least one frame of the first subset of frames and/or at least one frame of the second subset of frames;
    wherein said first subset of frames comprises a first number of frames and said second subset of frames comprises a second number of frames;
    wherein the method further comprises the step of:
    increasing or decreasing said first number of frames and/or said second number frames responsive to a characteristic detected in the image, wherein the characteristic in the image provides a cue for the device to increase or decrease said first number of frames and/or said second number frames.

11. The method according to claim 10, wherein the characteristic is one of: a facial feature, a luminaire, a light source, a movement of an object, a gesture, a person, an emotion, a contour, an edge, a shape, a code, or a location indicator.

12. The method according to claim 10, wherein the first group of camera settings comprises an exposure time of at most $1/1000$ seconds, wherein the second group of camera settings comprises an exposure time of at least $1/1000$ seconds.

13. A non-transitory computer readable medium including a computer program product for a computing device, the computer program product comprising computer program code to perform the method of claim 10 when the computer program product is run on a processing unit of the computing device.

* * * * *